(12) United States Patent
Ganapathy et al.

(10) Patent No.: US 6,411,953 B1
(45) Date of Patent: Jun. 25, 2002

(54) RETRIEVAL AND MATCHING OF COLOR PATTERNS BASED ON A PREDETERMINED VOCABULARY AND GRAMMAR

(75) Inventors: S. Kicha Ganapathy, Martinsville; Jianying Hu, Westfield, both of NJ (US); Jelena Kovacevic, New York, NY (US); Aleksandra Mojsilovic, Basking Ridge; Robert James Safranek, New Providence, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/236,854

(22) Filed: Jan. 25, 1999

(51) Int. Cl.[7] .............................................. G06F 17/30
(52) U.S. Cl. .............................. 707/6; 707/3; 707/104
(58) Field of Search ................................ 707/6, 3, 104, 707/2; 430/367, 369; 345/582, 426, 502, 592, 606; 358/447, 515, 537, 1.9; 382/305, 220, 165, 167, 209, 229

(56) References Cited

U.S. PATENT DOCUMENTS

| | | | | |
|---|---|---|---|---|
| 4,802,231 A | * | 1/1989 | Davis | 382/219 |
| 5,699,453 A | * | 12/1997 | Ozaki | 382/176 |
| 5,751,829 A | * | 5/1998 | Ringland et al. | 382/100 |
| 5,852,823 A | * | 12/1998 | Bonet | 707/6 |

(List continued on next page.)

OTHER PUBLICATIONS

Santini et al., "Similarity quries in image databases", pp. 646–651, IEEE, Jun. 18, 1996.*

(List continued on next page.)

Primary Examiner—Jean M. Corrielus
(74) Attorney, Agent, or Firm—Ryan & Mason

(57) ABSTRACT

The invention provides a perceptually-based system for pattern retrieval and matching, suitable for use in a wide variety of information processing applications. An illustrative embodiment of the system uses a predetermined vocabulary comprising one or more dimensions to extract color and texture information from an information signal, e.g., an image, selected by a user. The system then generates a distance measure characterizing the relationship of the selected image to another image stored in a database, by applying a grammar, comprising a set of predetermined rules, to the color and texture information extracted from the selected image and corresponding color and texture information associated with the stored image. The vocabulary may include dimensions such as overall color, directionality and orientation, regularity and placement, color purity, and pattern complexity and heaviness. The rules in the grammar may include equal pattern, overall appearance, similar pattern, and dominant color and general impression, with each of the rules expressed as a logical combination of values generated for one or more of the dimensions. The distance measure may include separate color and texture metrics characterizing the similarity of the respective color and texture of the two images being compared. The invention is also applicable to other types of information signals, such as sequences of video frames.

18 Claims, 4 Drawing Sheets

U.S. PATENT DOCUMENTS

| | | | | |
|---|---|---|---|---|
| 6,072,904 A | * | 6/2000 | Desai et al. | 382/225 |
| 6,122,391 A | * | 9/2000 | Ringland et al. | 382/100 |
| 6,163,622 A | * | 12/2000 | Abdel-Mottaleb et al. | 382/170 |
| 6,253,201 B1 | * | 6/2001 | Abdel-Mottaleb et al. | 707/4 |

OTHER PUBLICATIONS

T.V. Papathomas, "A Human Vision Based Computational Model for Chromatic Texture Segregation," IEEE Transactions on Systems, Man, and Cybernetics–Part B: vol. 27., No. 3, pp. 428–439, Jun. 1997.

W.Y. Ma et al., "Tools for Texture/Color Based Search of Images," SPIE, vol. 3016, pp. 496–505, 1997.

R. Manmatha et al., "A Syntactic Characterization of Appearance and its Application to Image Retrieval," SPIE, vol. 3016, pp. 484–495, 1997.

T. Frese et al., "A Methodology for Designing Image Similarity Metrics Based on Human Visual System Models," In. Proc. of SPIE, vol. 3016, pp. 472–479, 1997.

A.R. Rao et al., "Toward a Texture Naming system: Identifying Relevant Dimensions of Texture," Vision Res., vol. 36, No. 11, pp. 1650–1663, 1996.

* cited by examiner

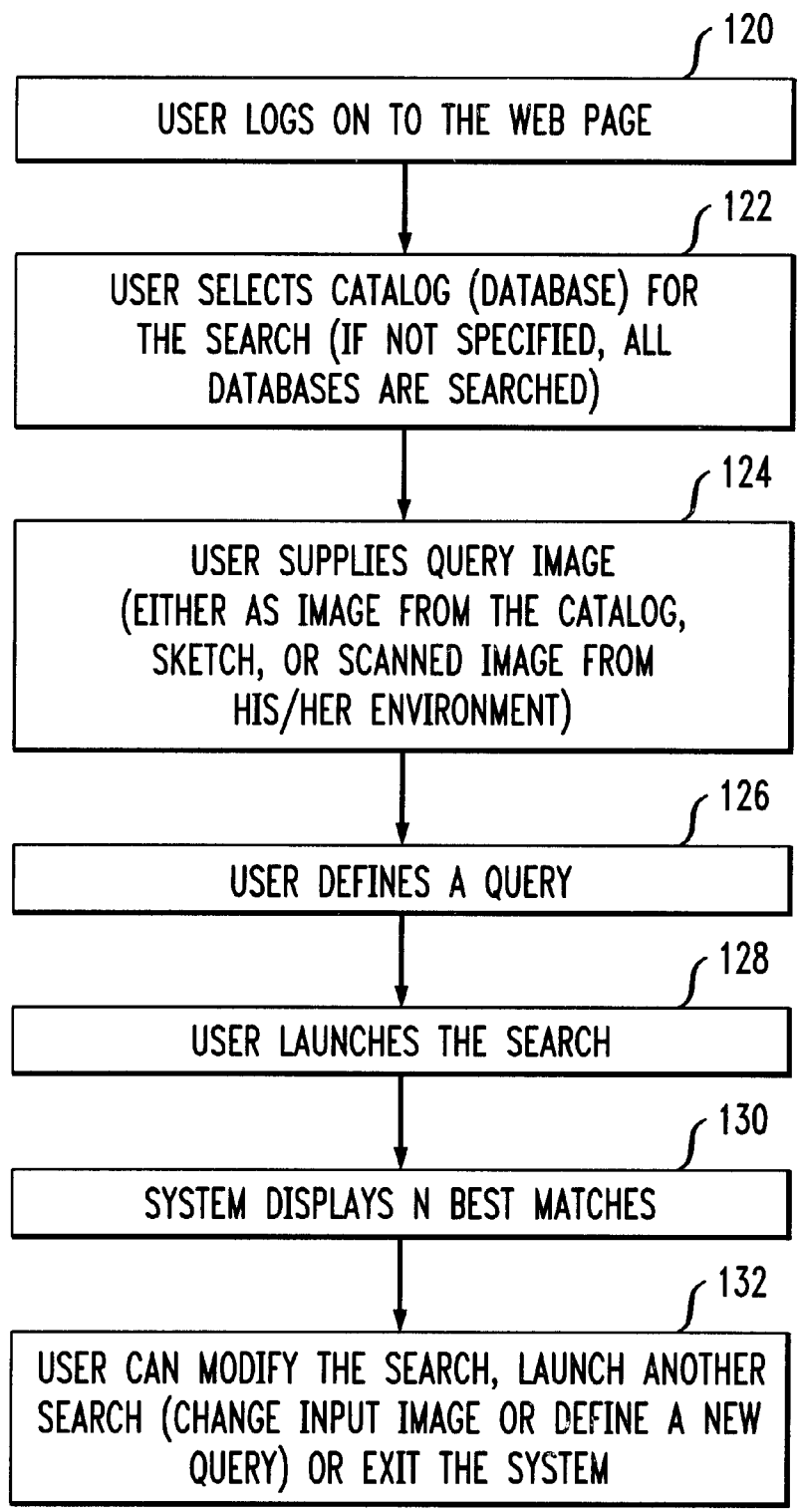

RETRIEVAL AND MATCHING OF COLOR PATTERNS BASED ON A PREDETERMINED VOCABULARY AND GRAMMAR

FIELD OF THE INVENTION

The present invention relates generally to techniques for processing images, video and other types of information signals, and more particularly to automated systems and devices for retrieving, matching and otherwise manipulating information signals which include color pattern information.

BACKGROUND OF THE INVENTION

Flexible retrieval and manipulation of image databases and other types of color pattern databases has become an important problem with applications in video editing, photo-journalism, art, fashion, cataloging, retailing, interactive CAD, geographic data processing, etc. Until recently, content-based retrieval (CBR) systems have generally required a user to enter key words to search image and video databases. Unfortunately, this approach often does not work well, since different people describe what they see or what they search for in different ways, and even the same person might describe the same image differently depending on the context in which it will be used.

One of the earliest CBR systems, known as ART MUSEUM and described in K. Hirata and T. Katzo, "Query by visual example," Proc. of $3^{rd}$ Int. Conf. on Extending Database Technology, performs retrieval entirely based on edge features. A commercial content-based image search engine with profound effects on later systems was QBIC, described in W. Niblack et al. "The QBIC project: Quering images by content using color, texture and shape," Proc. SPIE Storage and Retrieval for Image and Video Bases, February, 1994. As color representation, this system uses a k-element histogram and average of (R,G,B), (Y,i,q), and (L,a,b) coordinates, whereas for the description of texture it implements Tamura's feature set, as described in H. Tamura et al., "Textural features corresponding to visual perception," IEEE Transactions on Systems, Man and Cybernetics, Vol. 8, pp. 460–473, 1982.

In a similar fashion, color, texture and shape are supported as a set of interactive tools for browsing and searching images in the Photobook system developed at the MIT Media Lab, as described in A. Pentland et al., "Photobook: Content-based manipulation of image databases," International Journal of Computer Vision, 1996. In addition to providing these elementary features, systems such as VisualSeek, described in J. R. Smith and S. Chang, "VisualSeek: A fully automated content-based query system," Proc. ACM Multimedia 96, 1996, Netra, described in W. Y. Ma and B. S. Manjunath, "Netra: A toolbox for navigating large image databases," Proc. IEEE Int. Conf. on Image Processing, 1997, and Virage, described in A. Gupta, and R. Jain, "Visual information retrieval," Communications of the ACM, Vol. 40, No. 5, 1997, each support queries based on spatial relationships and color layout. Moreover, in the above-noted Virage system, the user can select a combination of implemented features by adjusting the weights according to his or her own "perception." This paradigm is also supported in RetrievalWare search engine described in J. Dowe, "Content based retrieval in multimedia imaging," Proc. SPIE Storage and Retrieval for Image and Video Databases, 1993.

A different approach to similarity modeling is proposed in the MARS system, described in Y. Rui et al., "Content-based image retrieval with relevance feed-back in Mars," Proc. IEEE Conf. on Image Processing, 1997, where the main focus is not in finding a best representation, but rather on the relevance feedback that will dynamically adapt multiple visual features to different applications and different users. Hence, although great progress has been made, none of the existing search engines offers a complete solution to the general image retrieval problem, and there remain significant drawbacks with the existing techniques which prevent their use in many important practical applications.

These drawbacks can be attributed to a very limited understanding of color patterns compared to other visual phenomena such as color, contrast or even gray-level textures. For example, the basic dimensions of color patterns have not yet been adequately identified, a standardized and effective set of features for addressing their important characteristics does not exist, nor are there rules defining how these features are to be combined. Previous investigations in this field have concentrated mainly on gray-level natural textures, e.g., as described in the above-cited H. Tamura et al. reference, and in A. R. Rao and G. L. Lohse, "Towards a texture naming system: Identifying relevant dimensions of texture," Vision Res., Vol. 36, No. 11, pp. 1649–1669, 1996. For example, the Rao and Lohse reference focused on how people classify textures in meaningful, hierarchically-structured categories, identifying relevant features used in the perception of gray-level textures. However, these approaches fail to address the above-noted color pattern problem, and a need remains for an effective framework for analyzing color patterns.

SUMMARY OF THE INVENTION

The invention provides a perceptually-based system for pattern retrieval and matching, suitable for use in a wide variety of information processing applications. The system is based in part on a vocabulary, i.e., a set of perceptual criteria used in comparison between color patterns associated with information signals, and a grammar, i.e., a set of rules governing the use of these criteria in similarity judgment. The system utilizes the vocabulary to extract perceptual features of patterns from images or other types of information signals, and then performs comparisons between the patterns using the grammar rules. The invention also provides new color and texture distance metrics that correlate well with human performance in judging pattern similarity.

An illustrative embodiment of a perceptually-based system in accordance with the invention uses a predetermined vocabulary comprising one or more dimensions to extract color and texture information from an information signal, e.g., an image, selected by a user. The system then generates a distance measure characterizing the relationship of the selected image to another image stored in a database, by applying a grammar, comprising a set of predetermined rules, to the color and texture information extracted from the selected image and corresponding color and texture information associated with the stored image. For example, the system may receive the selected image in the form of an input image A submitted in conjunction with a query from the user. The system then measures dimensions $DIM_i(A)$ from the vocabulary, for $i=1, \ldots, N$, and for each image B from an image database, applies rules $R_i$ from the grammar to obtain corresponding distance measures $dist_i(A, B)$, where $dist_i(A, B)$ is the distance between the images A and B according to the rule i.

In accordance with the invention, the vocabulary may include dimensions such as overall color, directionality and orientation, regularity and placement, color purity, and pattern complexity and heaviness. The rules in the grammar may include equal pattern, overall appearance, similar pattern, and dominant color and general impression, with each of the rules expressed as a logical combination of values generated for one or more of the dimensions. The distance measure may include separate color and texture metrics characterizing the similarity of the respective color and texture of the two patterns being compared.

A major advantage of a pattern retrieval and matching system in accordance with the invention is that it eliminates the need for selecting the visual primitives for image retrieval and expecting the user to assign weights to them, as required in most current systems. Furthermore, the invention is suitable for use in a wide variety of pattern domains, including art, photography, digital museums, architecture, interior design, and fashion.

BRIEF DESCRIPTION OF THE DRAWINGS

FIG. 5 is a flow diagram illustrating the operation of the pattern retrieval and matching system in the communication system of FIG. 4.

DETAILED DESCRIPTION OF THE INVENTION

Figure 1:
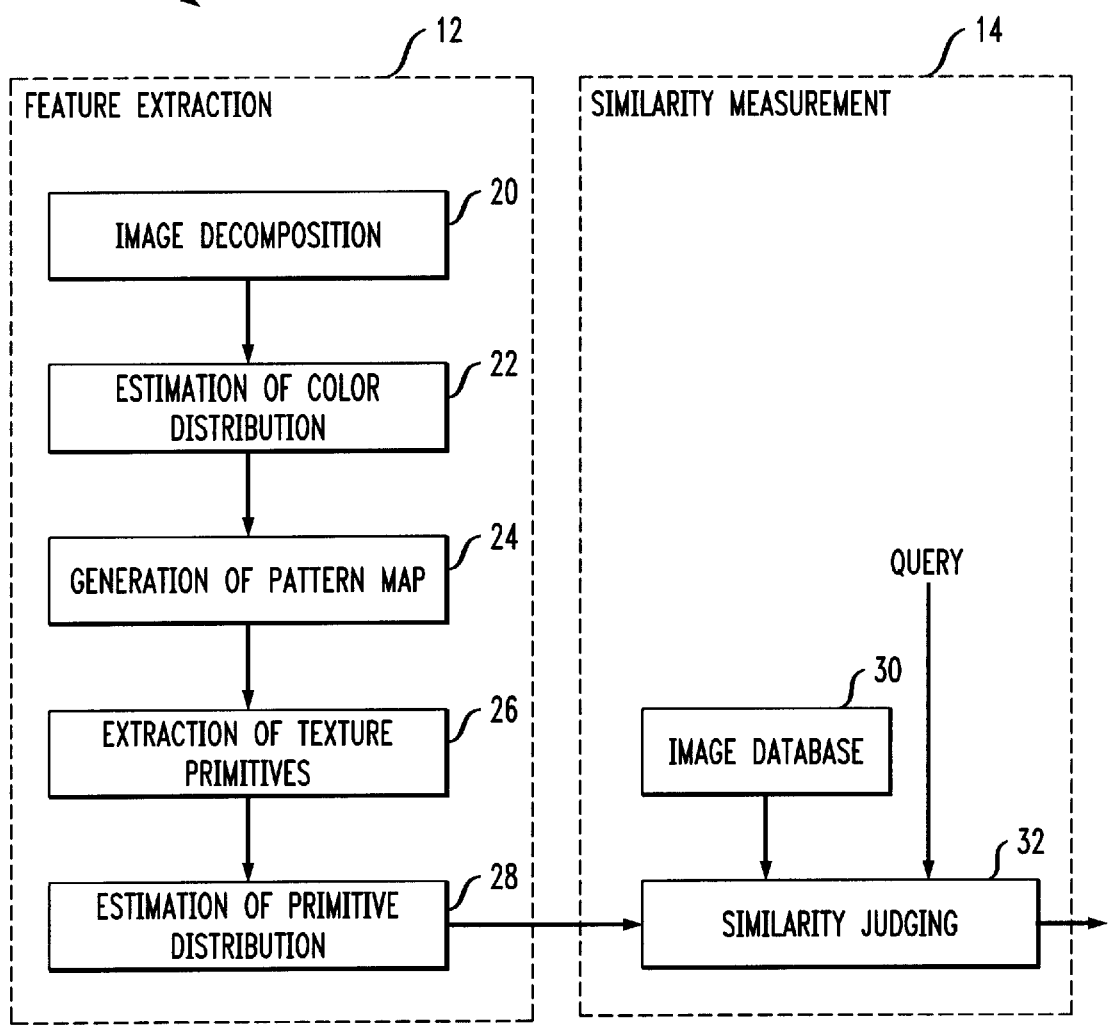
FIG. 1 shows a portion of pattern retrieval and matching system in accordance with the invention.

The invention provides a vocabulary, i.e., a set of perceptual criteria used in judging similarity of color patterns, their relative importance and relationships, as well as a grammar, i.e., a hierarchy of rules governing the use of the vocabulary in similarity judgment. It has been determined that these attributes are applicable to a broad range of textures, from simple patterns to complex, high-level visual texture phenomena. The vocabulary and grammar are utilized in a pattern matching and retrieval system that, in an illustrative embodiment, receives one or more information signals as input, and depending on the type of query, produces a set of choices modeled on human behavior in pattern matching. The term "information signal" as used herein is intended to include an image, a sequence of video frames, or any other type of information signal that may be characterized as including a pattern.

1.0 Vocabulary and Grammar of Color Patterns

The exemplary vocabulary and grammar to be described herein have been determined through experimentation, using multidimensional scaling and hierarchical clustering techniques to interpret the experimental data. Multidimensional scaling (MDS) was applied to determine the most important dimensions of pattern similarity, while hierarchical cluster analysis (HCA) was used to understand how people combine these dimensions when comparing color patterns.

MDS is a well-known set of techniques that uncover the hidden structures in data, and is described in greater detail in J. Kruskal and M. Wish, "Multidimensional scaling," Sage Publications, London, 1978. MDS is designed to analyze distance-like data called similarity data; that is, data indicating the degree of similarity between two items. Traditionally, similarity data is obtained via subjective measurement. It is acquired by asking people to rank similarity of pairs of objects, i.e., stimuli, on a scale. The obtained similarity value connecting stimulus i to stimulus j is denoted by $\delta_{ij}$. Similarity values are arranged in a similarity matrix $\Delta$, usually by averaging $\delta_{ij}$ obtained from all measurements. The aim of MDS is to place each stimulus from the input set into an n-dimensional stimulus space. The dimensionality n of the space is also determined in the experiment. The points $x_i=[x_{i1} \ldots x_{in}]$ representing each stimulus are arranged so that the Euclidean distances $d_{ij}$ between each pair of points in the stimulus space match as closely as possible the subjective similarities $\delta_{ij}$ between corresponding pairs of stimuli. Types of MDS suitable for use in conjunction with the invention include classical MDS (CMDS) and weighted MDS (WMDS). Additional details regarding these and other types of MDS may be found in the above-cited J. Kruskal and M. Wish reference.

HCA is described in greater detail in R. Duda and P. Hart, "Pattern classification and scene analysis," John Wiley & Sons, New York, N.Y., 1973. Given a similarity matrix, HCA organizes a set of stimuli into similar units. Therefore, HCA can be used to determine a set of rules and the rule hierarchy for judging similarity in pattern matching. This method starts from the stimulus set to build a tree. Before the procedure begins, all stimuli are considered as separate clusters, hence there are as many clusters as there are ranked stimuli. The tree is formed by successively joining the most similar pairs of stimuli into new clusters. At every step, either individual stimulus is added to the existing clusters, or two existing clusters are merged. The grouping continues until all stimuli are members of a single cluster. The manner in which the similarity matrix is updated at each stage of the tree is determined by the joining algorithm. There are many possible criteria for deciding how to merge clusters. Some of the simplest methods use a nearest neighbor technique, where the first two objects combined are those that have the smallest distance between them. Another commonly used technique is the furthest neighbor technique where the distance between two clusters is obtained as the distance between their furthest points. The centroid method, calculates the distances between two clusters as the distance between their means. Also, since the merging of clusters at each step depends on the distance measure, different distance measures can result in different clustering solutions for the same clustering method. These and other HCA techniques are described in detail in the above-cited R. Duda and P. Hart reference.

Clustering techniques are often used in combination with MDS, to clarify the obtained dimensions. However, in the same way as with the labeling of the dimensions in the MDS algorithm, interpretation of the clusters is usually done subjectively and strongly depends on the quality of the data.

1.1 Vocabulary: Most Important Dimensions of Color Patterns

The above-noted vocabulary will now be described in greater detail. Experiments were performed to determine subjective impressions of 20 different patterns from interior design catalogs. There were 28 subjects taking part in the experiment, each presented with all 190 possible pairs of patterns. For each pair, the subjects were asked to rate the degree of overall similarity on a scale rating from 0 for "very different" to 100 for "very similar." There were no instructions concerning the characteristics on which these similarity judgments were to be made, since this was what the experiment was designed to discover. The order of presentation for each subject was different and was determined through the use of a random number generator.

The first step in the data analysis was to arrange subjects' ratings into a similarity matrix Δ to be an input to a two-dimensional and three-dimensional CMDS procedure. Also, a WMDS procedure was applied to the set of 28 individual similarity matrices. WMDS was performed in two, three, four, five and six dimensions. The WMDS error for the two-dimensional solution was 0.31, indicating that a higher-dimensional solution was necessary, i.e., that the error was still substantial. The WMDS errors for the three-, four-, five- and six-dimensional configurations were 0.26, 0.20, 0.18 and 0.16, respectively. The analysis was Rot extended beyond six dimensions since further increases did not result in a noticeable decrease of the error.

The two-dimensional CMDS procedure indicated that the important dimensions were: 1) presence/absence of a dominant color, also referred to herein as "overall color," and 2) color purity. It is interesting that both dimensions are purely color based, indicating that, at the coarsest level of judgment, people primarily use color to judge similarity. As will be seen below, these dimensions remained in all solutions. Moreover, the two-dimensional configuration strongly resembles one of the perpendicular projections in the three-, four- and five-dimensional solutions. The same holds for all three dimensions from the three-dimensional solution, indicating that these features could be the most general in human perception. For both CMDS and WMDS, the same three dimensions emerged from the three-dimensional configurations: 1) overall color, 2) color purity, and 3) regularity and placement. The four-dimensional WMDS solution revealed the following dimensions: 1) overall color, 2) color purity, 3) regularity and placement, and 4) directionality. The five-dimensional WMDS solution came with the same four dominant characteristics with the addition of a dimension that is referred to herein as "pattern heaviness." This fifth dimension did not improve the goodness-of-fit significantly, since it changed the WMDS error from 0.20 (for four dimensions) to 0.18 (for five dimensions). Hence, as a result of the above-described experiment, the following five important similarity criteria were determined:

DIMENSION 1—overall color, which can be described in terms of the presence/absence of a dominant color. At the negative end of this dimension are patterns with an overall impression of a single dominant color. This impression is created mostly because the percentage of one color is truly dominant. However, a multicolored image can also create an impression of dominant color. This happens when all the colors within the multicolored image are similar, having similar hues but different intensities or saturation. At the positive end of this dimension are patterns where no single color is perceived as dominant.

DIMENSION 2—directionality and orientation. This dimension represents a dominant orientation in the edge distribution, or a dominant direction in the repetition of the structural element. The lowest values along this dimension have patterns with a single dominant orientation, such as stripes and then checkers. Midvalues are assigned to patterns with a noticeable but not dominant orientation, followed by the patterns where a repetition of the structural element is performed along two directions. Finally, completely nonoriented patterns and patterns with uniform distribution of edges or nondirectional placement of the structural element are at the positive end of this dimension.

DIMENSION 3—regularity and placement. This dimension describes the regularity in the placement of the structural element, its repetition and uniformity. At the negative end of this dimension are regular, uniform and repetitive patterns (with repetition completely determined by a certain set of placement rules), whereas at the opposite end are nonrepetitive or nonuniform patterns.

DIMENSION 4—color purity. This dimension divides patterns according to the degree of their colorfulness. At the negative end are pale patterns, patterns with unsaturated overtones, and patterns with dominant "sandy" or "earthy" colors. At the positive end are patterns with very saturated and very pure colors. Hence, this dimension is also referred to as overall chroma or overall saturation within an image.

DIMENSION 5—pattern complexity and heaviness. This dimension showed only in the last, five-dimensional configuration. Also, as will be shown below, it is not used in judging similarity until the very last level of comparison. For that reason it is also referred to herein as "general impression." At one end of this dimension are patterns that are perceived as "light" and "soft," while at the other end are patterns described by subjects as "heavy," "busy" and "sharp."

1.2 Grammar: Rules For Judging Similarity

A grammar, i.e., a set of rules governing use of the above-described dimensions, was then determined. HCA was used to order groups of patterns according to the degree of similarity, as perceived by subjects, and to derive a list of similarity rules and the sequence of their application. For example, it was observed that the very first clusters were composed of pairs of equal patterns. These were followed by the clusters of patterns with similar color and dominant orientation. The HCA analysis led to the following rules:

RULE 1—equal pattern. Regardless of color, two textures with exactly the same pattern are always judged to be the most similar. Hence, this rule uses Dimension 2 (directionality) and Dimension 3 (pattern regularity and placement).

RULE 2—overall appearance. Rule 2 uses the combination of Dimension 1 (dominant color) and Dimension 2 (directionality). Two patterns that have similar values in both dimensions are also perceived as similar.

RULE 3—similar pattern. Rule 3 concerns either Dimension 2 (directionality) or Dimension 3 (pattern regularity and placement). Hence, two patterns which are dominant along the same direction(s) are seen as similar, regardless of their color. In the same manner, patterns with the same placement or repetition of the structural element are seen as similar, even if the structural element is not exactly the same.

RULE 4—dominant color. Two multicolored patterns are perceived as similar if they possess the same color distributions regardless of their content, directionality, placement or repetition of a structural element. This also holds for patterns that have the same dominant or overall color. Hence, this rule involves only Dimension 1 (dominant color).

RULE 5—general impression. Rule 5 concerns Dimensions 4 and 5, and divides patterns into "dim", "smooth", "earthy", "romantic" or "pale" patterns (at one end of the corresponding dimension) as opposed to "bold", "bright", "strong", "pure", "sharp", "abstract" or "heavy" patterns (at the opposite end). This rule represents the complex combination of color, contrast, saturation and spatial frequency, and therefore applies to patterns at the highest, abstract level of understanding.

The above set of rules represents an illustrative embodiment of a basic grammar of pattern matching in accordance with the invention. It should be noted that, in a given application, each rule can be expressed as a logical expression, e.g., a logical combination, using operators such as OR, AND, XOR, NOT, etc., of the pattern values along the dimensions involved in the rule. For example, consider a cluster composed of Patterns X and Y that have similar overall color and dominant orientation. The values associated with Patterns X and Y along both Dimensions 1 and 2 are very close. Consequently, X and Y are perceived as similar according to the Rule 2, which may be expressed in the following way:

($DIM_1(X)$ similar to $DIM_1(Y)$) AND ($DIM_2(X)$ similar to $DIM_2(Y)$).

Of course, numerous other logical expressions involving the values of particular patterns along a given set of dimensions may be generated in accordance with the invention.

2.0 Overview of the System

An illustrative embodiment of an exemplary pattern retrieval and matching system in accordance with the invention will now be described. The system utilizes the above-described basic vocabulary V of color patterns consisting of Dimensions 1 to 5: $V=\{DIM_1, \ldots, DIM_5\}$, and the grammer G, i.e., the rules governing the use of the dimensions from the vocabulary V: $G=\{R_1, R_2, R_3, R_4, R_5\}$. The illustrative embodiment of the system will, given an input image A and a query Q: measure the dimensions $DIM_i(A)$ from the vocabulary, for i=1, . . . , 5, and for each image B from an image database, apply rules $R_1$ through $R_5$ from G and obtain corresponding distance measures $dist_1(A, B)$, . . . , $dist_5(A, B)$, where $dist_i(A, B)$ is the distance between the images A and B according to the rule i.

FIG. 1 shows a block diagram of a pattern retrieval and matching system 10. The system 10 includes a feature extraction component 12, which measures the dimensions from vocabulary V, and a similarity measurement component 14, in which similar patterns are found using the rules from the grammar G. The feature extraction component 12 is designed to extract Dimensions 1 to 4 of pattern similarity. Dimension 5 (pattern complexity and heaviness) is not implemented in this illustrative embodiment, since experiments have shown that people generally use this criterion only at a higher level of judgment, e.g., while comparing groups of textures. The similarity measurement component 14 in this embodiment performs a judgment of similarity according to Rules 1, 2, 3 and 4 from G. Rule 5 is not supported in the illustrative embodiment, since it is only used in combination with Dimension 5 at a higher level of pattern matching, e.g., subdividing a group of patterns into romantic, abstract, geometric, bold, etc.

It is important to note that the feature extraction component 12 is developed in accordance with a number of assumptions derived from psychophysical properties of the human visual system and conclusions extracted from the above-noted experiment. For example, it is assumed that the overall perception of color patterns is formed through the interaction of luminance component L, chrominance component C and achromatic pattern component AP. The luminance and chrominance components approximate signal representation in the early visual cortical areas while the achromatic pattern component approximates signal representation formed at higher processing levels, as described in T. N. Cornsweet, "Visual perception," Academic Press, Orlando, 1970. Therefore, the feature extraction component 12 simulates a similar mechanism, i.e., it decomposes an image map into luminance and chrominance components in the initial stages, and models pattern information later, as will be described in detail below.

As in the human visual system, a first approximation is that each of these components is processed through separate pathways. While luminance and chrominance components are used for the extraction of color-based information, the achromatic pattern component is used for the extraction of purely texture-based information. However, one can be more precise by accounting for residual interactions along the pathways, as described in R. L. DeValois and K. K. DeValois, "Spatial Vision," New York: Oxford University Press, 1990. The invention accomplishes this by extracting the achromatic pattern component from the color distribution, instead of using the luminance signal as in previous models. Moreover, as will be described below, the discrete color distribution is estimated through the use of a specially-designed perceptual codebook allowing the interaction between the luminance and chrominance components.

The feature extraction component 12 extracts features by combining the following three major domains: a) a nonoriented luminance domain represented by the luminance component of an image, b) an oriented luminance domain represented by the achromatic pattern map, and c) a non-oriented color domain represented by the chrominance component. The first two domains are essentially "color blind," whereas the third domain caries only the chromatic information. Additional details regarding these domains can be found in, e.g., M. S. Livingstone and D. H. Hubel, "Segregation of form, color, movement and depth: Anatomy, physiology and perception," Science, Vol. 240, pp. 740–749, 1988. The domains have been experimentally verified in perceptual computational models for segregation of color textures, as described in T. V. Papathomas et al., "A human vision based computational model for chromatic texture segregation," IEEE Transactions on Systems, Man and Cybernetics—Part B: Cybernetics, Vol. 27, No. 3, June 1997. In accordance with the invention, purely color-based dimensions (1 and 4) are extracted in the nonoriented domains and are measured using the color feature vector. Texture-based dimensions (2 and 3) are extracted in the oriented luminance domain, through the scale-orientation processing of the achromatic pattern map.

The feature extraction component 12 as shown in FIG. 1 includes processing blocks 20, 22, 24, 26 and 28. Image decomposition block 20 transforms an input image into the Lab color space and decomposes it into luminance L and chrominance C=(a,b) components. Estimation of color distribution block 22 uses both L and C maps for color distribution estimation and extraction of color features, i.e., performs feature extraction along the color-based Dimensions 1 and 4. Pattern map generation block 24 uses color features extracted in block 22 to build the achromatic pattern map. Texture primitive extraction and estimation blocks 26 and 28 use the achromatic pattern map to estimate the spatial distribution of texture primitives, i.e., to perform feature extraction along texture-based Dimensions 2 and 3.

The similarity measurement component 14 finds similar patterns using the rules from the grammar G. The similarity measurement component 14 accesses an image database 30, and includes a similarity judging block 32. Given an input image A, which may be submitted or selected as part of a user query Q, for a designated set of the images in the database 30, rules $R_1$ through $R_4$ are applied and corresponding distance measures are computed. Then, depending on the query Q, a set of best matches is found.

3.0 Feature Extraction Based on Color Information

Figure 2:
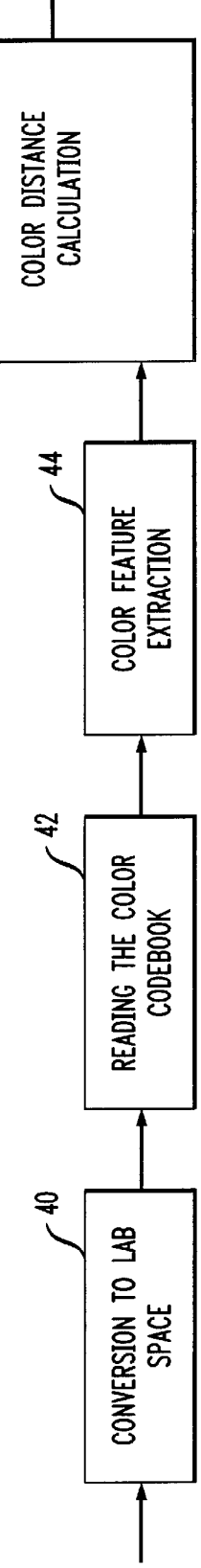
FIG. 2 shows a more detailed view of a color representation and modeling process implemented in a feature extraction element in the FIG. 1 system.

The feature extraction based on color information will now be described in greater detail with reference to FIG. 2. FIG. 2 shows the processing of color information, as distinguished from texture information, in the system 10 of FIG. 1. Since color representation is used in the FIG. 1 system both for the extraction of color-related dimensions (color features), and for the construction of the achromatic pattern map (used later in texture processing), the feature extraction component 12 generates a compact, perceptually-based color representation. As shown in FIG. 2, this representation is generated and processed using processing blocks 40, 42, 44 and 46. In block 40, the input image is transformed into the Lab color space. This block corresponds to the image decomposition block 20 of FIG. 1. In block 42, which may be viewed as an element of block 22 of FIG. 1, a color distribution is determined using a vector quantization-based histogram technique which involves reading a color codebook. Block 44, which also may be viewed as an element of block 22, extracts significant color features from the histogram generated in block 42. Block 46, which may be viewed as an element of the similarity judging block 32, then performs a color distance calculation to determine the perceptual similarity between the determined color distribution and the corresponding distribution of an image from the database 30.

3.1 Image Conversion

The conversion of the input image from RGB to Lab color space in block 40 of FIG. 2 will now be described in greater detail. An important decision to be made in deriving a color feature representation is which color space to use. In order to produce a system that performs in accordance with human perception, a representation based on human color matching may be used. CIE Lab is such a color space, and is described in G. Wyszecki and W. S. Stiles, "Color science: Concepts and methods, quantitative data and formulae," John Wiley and Sons, New York, 1982. The Lab color space was designed so that inter-color distances computed using the $L^2$-norm correspond to subjective color matching data. This representation is obtained from an RGB representation (or any other linear color representation such as YIQ, YUV, etc.) by first linearizing the input data, i.e., removing gamma correction. Next, the data is transformed into the XYZ color space using a linear operator. In the XYZ space, the data is normalized with respect to the illumination white point, and then converted to the Lab representation via a nonlinear transform. Additional details on this conversion process and the design of the Lab color space may be found in the above-cited G. Wyszecki and W. S. Stiles reference.

One potential difficulty with this approach is that for most images, the white point is unknown. This problem is avoided in the illustrative embodiment by using exclusively the D65 white point, which corresponds "outdoor daylight" illumination. As long as all of the images are taken under the same lighting conditions, this is not a problem. However, its use for images taken under other lighting conditions can cause some shift in the estimated color distribution. In general, these shifts are relatively small and the dominant color representation, to be described below, appears to be able to accommodate the inaccuracies introduced by the fixed white point assumption. It should be noted that images taken under strongly colored lighting will generally not be represented correctly.

After determining a perceptually meaningful color representation for the $L^2$ distance metric, the next step is to estimate the color distribution in the input image by computing a histogram of the input color data. This requires specifying a set of bin centers and decision boundaries. Since linear color spaces (such as RGB) can be approximated by 3D cubes, bin centers can be computed by performing separable, equidistant disctetizations along each of the coordinate axes. Unfortunately, by going to the nonlinear Lab color space, the volume of all possible colors distorts from a cube to an irregular cone. Consequently, there is no simple discretization that can be applied to this volume.

3.2 Histogram Design

To estimate color distributions in the Lab space, for the volume which represents valid colors, the set of bin centers and decision boundaries which minimize some error criterion are determined. In the Lab color system, $L^2$-norm corresponds to perceptual similarity, thus representing the optimal distance metric for that space. Therefore, to obtain an optimal set of bin centers and decision boundaries, one attempts to find Lab coordinates of N bin centers so that the overall mean-square classification error is minimized. Since this is the underlying problem in vector quantization (VQ), the LGB vector quantization algorithm, described in A. Gersho and R. M. Gray, "Vector quantization and signal processing," Kluwer Academic Publishers, Boston, 1992, may be used to obtain a set of codebooks which optimally represent the valid colors in the Lab space.

In any VQ design, the training data can have a large effect on the final result. A commonly used VQ design approach selects training images which are: a) either representative of a given problem so the codebook is optimally designed for that particular application, or b) span enough of the input space. so the resulting codebook can be used in many different applications. The following problem occurs with both of these approaches: in order to obtain an accurate estimation for the distribution of all possible colors, a large. number of training images is required. This results in a computationally expensive and possibly intractable design problem. To overcome this problem, the present invention takes a different approach. Since we need to deal with an arbitrary input, we will assume that every valid color is equi-probable. Hence, a synthetic set of training data can be generated by uniformly quantizing the XYZ space. This data was transformed into the Lab space and then used as input to a standard VQ design algorithm. This resulted in a set of codebooks ranging in size from 16 to 512 colors.

A potential drawback of these codebooks is that they are designed as a global representation of the entire color space and consequently, there is no structure to the bin centers. In an embodiment of the invention which allows a user to interact with the retrieval process, it is desirable for the color representation to provide manipulation with colors in a "human-friendly" manner. To simulate human performance in color perception, a certain amount of structure on the relationships between the L, a, and b components must be introduced. One possible way to accomplish this is by separating the luminance L, from the. chrominance (a,b) components. In the illustrative embodiment, a one-dimensional quantization is first applied on luminance values of the training data, e.g., using a Lloyd-Max quantizer. Then, after partitioning the training data into slices of similar luminance, a separate chrominance codebook is designed for each slice by applying the LBG algorithm to the appropriate (a,b) components.

This color representation better mimics human perception and allows the formulation of functional queries such as looking for "same but lighter color," "paler," "contrasting," etc. For example, the formulation of a query vector to search for a "lighter" color can be accomplished through the following steps: 1) extract the luminance $L_Q$ and the $(a_Q, b_Q)$ pair for the query color, 2) find the codebook for a higher luminance level $L>L_Q$, 3) in this codebook, find the cell which corresponds to the (a,b) entry which is the closest to $(a_Q, b_Q)$ in the $L^2$ sense, and 4) retrieve all images having (L,a,b) as a dominant color. Moreover, starting from the relationship between L, a, and b values for a particular color, and its hue H and saturation S, $$H = \arctan\frac{b}{a}, \quad S = \sqrt{a^2 + b^2},$$

similar procedures can be applied to satisfy user queries such as "paler color," "bolder color," "contrasting color," etc. Finally, in applications in which the search is performed between different databases or when the query image is supplied by the user, separation of luminance and chrominance allows for elimination of the unequal luminance condition. Since the chrominance components contain the information about the type of color regardless of the intensity value, color features can be extracted only in the chrominance domain $C(i,j)=\{a(i,j),b(i,j)\}$, for the corresponding luminance level, thus allowing for comparison between images of different quality.

3.3 Color Feature Extraction

Color histogram representations based on color codebooks have been widely used as a feature vector in image segmentation and retrieval, as described in, e.g., M. Ioka, "A method of defining the similarity of images on the basis of color information," Technical Report RT-0030, IBM Research, Tokyo Research Laboratory, November 1989, and M. Swain and D. Ballard, "Color indexing," International Journal of Computer Vision, Vol. 7, No. 1, 1991. Although good results have been reported, a feature set based solely on the image histogram may not provide a reliable representation for pattern matching and retrieval. This is due to the fact that most patterns are perceived as combinations of a few dominant colors. For that reason, the illustrative embodiment of the invention utilizes color features and associated distance measures comprising the subset of colors which best represent an image, augmented by the area percentage in which each of these colors occur.

One implementation of the system 10 of FIG. 1 uses a codebook with N=71 colors denoted by $C_{71}=\{C_1,C_2,\ldots,C_{71}\}$ where each color $C_i=\{L_i,a_i,b_i\}$ is a three-dimensional Lab vector. As the first step in the feature extraction procedure (before histogram calculation), the input image is convolved with a B-spline smoothing kernel. This is done to refine contours of texture primitives and foreground regions, while eliminating most of the background noise. The B-spline kernel is used since it provides an optimal representation of a signal in the $L^2$ sense, hence minimizing the perceptual error, as described in M. Unser et al., "Enlargement or reduction of digital images with minimum loss of information," IEEE Trans. Image Processing, Vol. 4, pp. 247–257, March 1995. The second step (after the histogram of an image is generated) involves extraction of dominant colors to find colors from the codebook that adequately describe a given texture pattern. This was implemented by sequentially increasing the number of colors until all colors covering more than 3% of the image area have been extracted. The remaining pixels were represented with their closest matches (in an $L^2$ sense) from the extracted dominant colors. Finally, the percentage of each dominant color was calculated and the color feature vectors were obtained as $$f_c=\{(i_j,p_j)|j\in[1,N],p_j\in[0,1]\}$$

where $i_j$ is the index in the codebook, $p_j$ is the corresponding percentage and N is the number of dominant colors in the image. Another similar representation has been successfully used in image retrieval, as described in W. Y. Ma et al., "Tools for texture/color base search of images," Proc. of SPIE, Vol. 3016, 1997.

The above-described feature extraction of the present invention has several advantages. For example, it provides an optimal representation of the original color content by minimizing the MSE introduced when using a small number of colors. Then, by exploiting the fact that the human eye cannot perceive a large number of colors at the same time, nor is it able to distinguish close colors well, a very compact feature representation is used. This greatly reduces the size of the features needed for storage and indexing. Furthermore, because of the codebook used, this representation facilitates queries containing an overall impression of patterns expressed in a natural way, such as "find me all blue-yellow fabrics," "find me the same color, but a bit lighter," etc. Finally, in addition to storing the values of the dominant colors and their percentages, the system also stores the actual number of dominant colors. This information is useful in addressing the more complex dimensions of pattern similarities, e.g., searching for simple and single colored patterns, versus heavy, multicolored ones.

3.4 Color Metric

The color features described above, represented as color and area pairs, allow the definition of a color metric that closely matches human perception. The idea is that the similarity between two images in terms of color composition should be measured by a combination of color and area differences. Given two images, a query image A and a target image B, with $N_A$ and $N_B$ dominant colors, and feature vectors $f_c(A)=\{(i_a,p_a)|a\in[1,N_A]\}$ and $f_c(B)=\{(i_b,p_b)|b\in[1,N_B]\}$, respectively, the similarity between these two images is first defined in terms of a single dominant color. Suppose that i is the dominant color in image A. Then, the similarity between A and B is measured in terms of that color using the minimum of distance measures between the color element (i, p) and the set of color elements $\{(i_b,p_b)|b\in[1,N_B]\}$:

$$d(i, B) = \min_{b\in[1,N_B]} D((i, p), (i_b, p_b)),$$

where $$D((i, p), (i_b, p_b)) = |p - p_b| + \sqrt{(L-L_b)^2 + (a-a_b)^2 + (b-b_b)^2}.$$

Once the distance d(i,B) has been calculated, besides its value we also use its argument to store the color value from B that, for a particular color i from A, minimizes d(i,B). We denote this color value by k(i, B) as:

$$k(i,B)=\arg d(i,B).$$

Note that the distance between two color/area pairs is defined as the sum of the distance in terms of the area percentage and the distance in the Lab color space, both within the range [0,1]. The above-cited W. Y. Ma et al. reference used a different definition where the overall distance is the product of these two components. That definition has the drawback that when either component distance is very small the remaining component becomes irrelevant. Consider the extreme case, when the color distance between two color/area pairs is 0. This is not unusual since the color space has been heavily quantized. Then, even if the difference between the two area percentages is very large, the overall distance is 0, yielding a measure that does not match human perception. The illustrative embodiment of the invention provides a simple and effective remedy to that problem, namely, it guarantees that both color and area components contribute to the perception of color similarity.

Given the distance between two images in terms of one dominant color as defined above, the distance in terms of overall color composition is defined as the sum over all dominant colors from both images, in the following way: 1) for image A, $\forall a \in [1, N_A]$ find $k_A(i_a, B)$ and the corresponding distance $d(i_a, B)$, 2) repeat this procedure for all dominant colors in B, that is, $\forall b \in [1, N_B]$ find $k_B(i_b, B)$ and $d(i_b, A)$, and 3) calculate the overall distance as $$dist(A, b) = \sum_{a \in [1, N_A]} d(i_a, B) + \sum_{b \in [1, N_B]} d(i_b, A).$$

Other types of distance calculations could also be used to generate a color metric in accordance with the invention.

4.0 Feature Extraction Based on Texture Information

Figure 3:
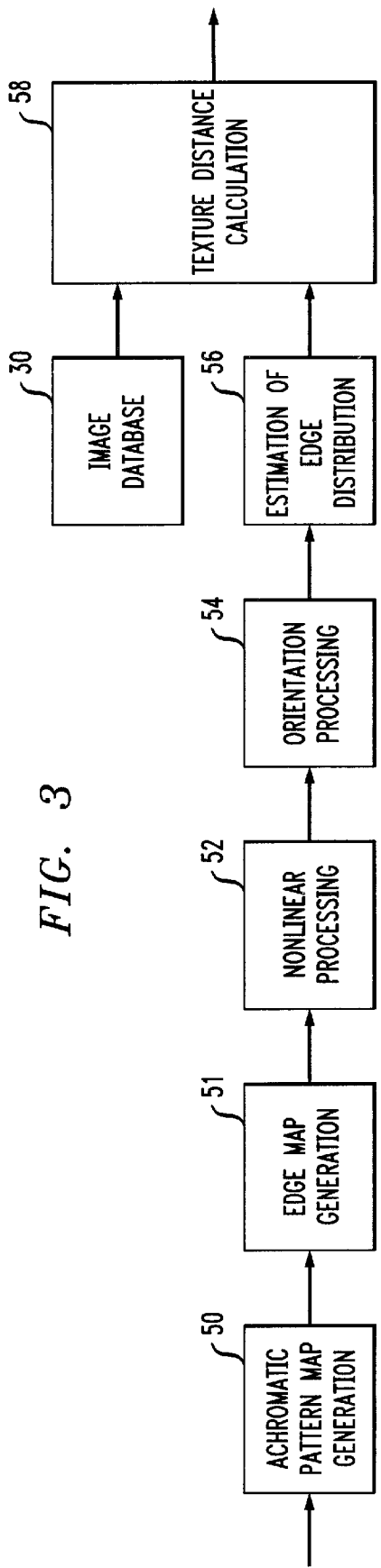
FIG. 3 shows a more detailed view of a texture representation and modeling process implemented in the feature extraction element in the FIG. 1 system.

The feature extraction based on texture information will now be described in greater detail with reference to FIG. 3. FIG. 3 shows the processing of texture information, as distinguished from color information, in the system 10 of FIG. 1. As shown in FIG. 3, this representation is generated and processed using processing blocks 50, 51, 52, 54, 56 and 58. In block 50, the achromatic pattern map is generated from the color feature vector, after spatial smoothing to refine texture primitives and remove background noise. This block corresponds to the pattern map generation block 24 of FIG. 1. In block 51, which may be viewed as an element of block 26 of FIG. 1, the edge map is built from the achromatic pattern map. Block 52 applies a nonlinear mechanism to suppress nontextured edges. Block 54 performs orientation processing to extract the distribution of pattern contours along different spatial directions. Blocks 52 and 54 may be viewed as elements of block 26 of FIG. 1. Block 56, which corresponds to block 28 of FIG. 1, computes a scale-spatial estimation of texture edge distribution. Block 58, which may be viewed as an element of the similarity judging block 32, then performs a texture distance calculation to determine the perceptual similarity between the determined texture edge distribution and the corresponding distribution of an image from the database 30.

The achromatic map in block 50 is obtained in the following manner: For a given texture, by using the number of its dominant colors N, a gray level range of 0 to 255 is discretized into N levels. Then, dominant colors are mapped into gray levels according to the following rule: Level 0 is assigned to the dominant color with the highest percentage of pixels, the next level is assigned to the second dominant color, etc., until the level 255 has been assigned to a dominant color with the lowest area percentage. In other words, the achromatic pattern map models the fact that human perception and understanding of form, shape and orientation is completely unrelated to color. Furthermore, it resolves the problem of secondary interactions between the luminance and chrominance pathways. As an example, consider a pair of textures in which the values in the luminance map are much higher for one of the textures, hence the edge amplitudes, and edge distributions are different for the two corresponding images. Moreover, the dominant colors are not close, which makes the classification of these two patterns as similar (either using luminance, chrominance or color features) extremely difficult. However, in the above-described model, the way that luminance and chrominance are coupled into a single pattern map guarantees that both textures will have identical achromatic pattern maps, leading to almost identical texture feature vectors.

The objective of edge and orientation processing in blocks 51, 52 and 54 is to extract information about the pattern contours from the achromatic pattern map. Instead of applying a bank of oriented filters, as in previous models, the illustrative embodiment of the present invention computes polar edge maps and uses them to extract distribution of edges along different directions. This approach makes it possible to obtain the edge distribution for an arbitrary orientation with low computational cost. It also introduced certain flexibility in the extraction of texture features since, if necessary, the orientation selectivity can be enhanced by choosing an arbitrary number of orientations. In the illustrative system 10, edge-amplitude and edge-angle maps, calculated at each image point, are used. Edge maps were obtained by convolving an input achromatic pattern map with the horizontal and vertical derivatives of a Gaussian and converting the result into polar coordinates. The derivatives of a Gaussian along x and y axes were computed as $$g_x(i,j) = xe^{-(i^2+j^2)}, \quad g_y(i,j) = ye^{-(i^2+j^2)},$$

while the derivatives of the achromatic pattern map along x and y axes were computed as $$A_x(i,j) = (g_x * AP)(i,j), \quad A_y(i,j) = (g_y * AP)(i,j),$$

where * stands for two-dimensional convolution. These derivatives were then transformed into their polar representation as:

$$A(i, j) = \sqrt{(A_x(i, j))^2 + (A_y(i, j))^2},$$

$$\theta(i, j) = \tan^{-1} \frac{(A_y(i, j))^2}{(A_x(i, j))^2}, \quad \theta(i, j) \in \left[-\frac{\pi}{2}, \frac{\pi}{2}\right].$$

Texture phenomenon is created through the perception of image "edgeness" along different directions, over different scales. Hence, to estimate the placement and organization of texture primitives, information about the edge strength at a certain point is not needed; rather, it is only necessary to know a) whether an edge exists at this point, and b) the direction of the edge. Therefore, after the transformation into the polar representation, the amplitude map is nonlinearly processed as:

$$A_Q(i, j) = \begin{cases} 1, & med(A(i, j)) \geq T \\ 0, & med(A(i, j)) < T \end{cases},$$

where med (.) represents the median value calculated over a 5×5 neighborhood. Nonlinear median operation was introduced to suppress false edges in the presence of stronger ones, and eliminate weak edges introduced by noise. The quantization threshold T is determined as:

$$T = \mu_A - 2\sqrt{\sigma^2_A},$$

where $\mu_A$ and $\sigma^2_A$ are the mean and variance of the edge amplitude, estimated on a set of 300 images. This selection allowed all the major edges to be preserved. After quantizing the amplitude map, the discretization of the angle space is performed, dividing it into the six bins corresponding to directions 0°, 30°, 60°, 90°, 120° and 150°, respectively. For each direction an amplitude map $A_{\theta_i}(i,j)$ is built as:

$$A_{\theta_i}(i,j) = \begin{cases} 1, & A_Q(i,j) = 1 \wedge \theta(i,j)) \in \theta_i \\ 0, & A_Q(i,j) = 0 \vee \theta(i,j)) \notin \theta_i \end{cases}, \quad i=1,\ldots,6.$$

where "∧" denotes a logic "and" operator and "∨" denotes a logic "or" operator. The $\theta_i$ in this example correspond to the six directions identified above.

To address the textural behavior at different scales, mean and variance of edge density distribution is estimated, by applying overlapping windows of different sizes to the set of directional amplitude maps. For a given scale, along a given direction, edge density is calculated simply by summing the values of the corresponding amplitude map within the window, and dividing that value by the total number of pixels in the window. Four scales were used in the illustrative embodiment, with the following parameters for the sliding window:

Scale 1: $WS_1 = .75W \times .75H$, $N_1 = 30$,

Scale 2: $WS_2 = .40W \times .40H$, $N_2 = 56$,

Scale 3: $WS_3 = .20W \times .20H$, $N_3 = 80$,

Scale 4: $WS_4 = .10W \times .10H$, $N_4 = 224$, where $WS_i$ and $N_i$ are window size and number of windows for scale i, and W and H are the width and height of the input texture. Note that the above approach is scale (zoom) invariant. In other words, the same pattern at different scales will have similar feature vectors.

The output of the above-described texture processing block 56 is a texture feature vector of length 48:

$$f_t = [\mu_1^{\theta_1} \sigma_1^{\theta_1} \mu_1^{\theta_2} \sigma^{\theta_2}_1 \ldots \mu_1^{\theta_6} \sigma_1^{\theta_6} \mu_2^{\theta_1} \sigma_2^{\theta_1} \ldots \mu_4^{\theta_6} \sigma_4^{\theta_6}],$$

where $\mu_i^{\theta_j}$ and $\sigma_i^{\theta_j}$ stand for mean and standard deviation of texture edges at scale i along the direction $\theta_j$. Each feature component may be normalized so that it assumes the mean value of 0 and standard deviation of 1 over the whole database. In that way this feature vector essentially models both texture-related dimensions (directionality and regularity): the distribution estimates along the different directions address the dimension of directionality. At any particular scale, the mean value can be understood as an estimation of the overall pattern quality, whereas the standard deviation estimates the uniformity, regularity and repetitiveness at this scale, thus addressing the dimension of pattern regularity.

4.1 Texture Metric

As previously mentioned, at any particular scale, the mean values measure the overall edge pattern and the standard deviations measure the uniformity, regularity and repetitiveness at this scale. The above-noted experiments demonstrated that the perceptual texture similarity between two images is a combination of these two factors in the following way: if two textures have very different degrees of uniformity they are immediately perceived as different. On the other hand, if their degrees of uniformity, regularity and repetitiveness are close, their overall patterns should be further examined to judge similarity. The smooth transition between these two factors can be implemented using an exponential function. Thus, the distance between the query image A and the target image B, with texture feature vectors $f_t(A) = [\mu_{1A}^{\theta_1} \ldots \sigma_{4A}^{\theta_6}]$ and $f_t(B) = [\mu_{1B}^{\theta_1} \ldots \sigma_{4B}^{\theta_6}]$, respectively, is defined as:

$$M_i^{\theta_j} = |\mu_{iA}^{\theta_j} - \mu_{iB}^{\theta_j}|, \quad D_i^{\theta_j} = |\sigma_{iA}^{\theta_j} - \sigma_{iB}^{\theta_j}|,$$

$$d_i^{\theta_j} = w_M(i,\theta_j)M_i^{\theta_j} + w_D(i,\theta_j)D_i^{\theta_j}$$

$$= \frac{e^{-\alpha\left(D_i^{\theta_j} - Do\right)}}{1 + e^{-\alpha\left(D_i^{\theta_j} - Do\right)}} M_i^{\theta_j} + \frac{1}{1 + e^{-\alpha\left(D_i^{\theta_j} - Do\right)}} D_i^{\theta_j},$$

$$dist(A,B) = \sum_i \sum_j d_i^{\theta_j}.$$

At each scale i and direction $\theta_j$, the distance function $d_i^{\theta_j}$ is the weighted sum of two terms: the first $M_i^{\theta_j}$ measuring the difference in mean edge density and the second $D_i^{\theta_j}$, measuring the difference in standard deviation, or regularity. The weighting factors, $w_M(i,\theta_j)$ and $w_D(i,\theta_j)$, are designed such that when the difference in standard deviation is small, the first term is more dominant; as it increases, the second term becomes dominant, thus matching human perception as stated above.

The parameters $\alpha$ and Do control the behavior of the weighting factors, where $\alpha$ controls the sharpness of the transition, and Do defines the transition point. These two parameters were trained in the illustrative embodiment using 40 images taken from an interior design database, in the following way. First, 10 images were selected as representatives of the database. Then, for each representative, 3 comparison images were chosen as the most similar, close and least similar to the representative. For each representative image $I_i$, i=1, . . . , 10, the comparison images $C_{i,j}$, j=1, . . . , 3 are ordered in decreasing similarity. Thus, sets $\{I_i\}$ and $\{C_{i,j}\}$ represent the ground truth. For any given set of parameters $(\alpha, Do)$, the rankings of the comparison images as given by the distance function can be computed. Let $rank_{ij}(\alpha,Do)$ represent the ranking of the comparison image $C_{i,j}$ for representative image $I_i$. Ideally, one would like to achieve $rank_{ij}(\alpha,Do)=j, \forall i,j | i \in [1,10], j \in [1,3].$ The deviation from ground truth is computed as $$D(\alpha, Do) = \sum_{i=1}^{10} d_i(\alpha, Do),$$

where $$d_i(\alpha, Do) = \sum_{j=1}^{3} \left| dist(I_i, C_{i,j}) - dist(I_i, C_{i,rank_{ij}(\alpha,Do)}) \right|.$$

The goal of the above-described parameter training is to minimize the function $D(\alpha,Do)$. Many standard optimization algorithms can be used to achieve this. For example, Powell's algorithm, as described in William H. Press et al., "Numerical Recipes in C," 2nd edition, pp. 412—420, Cambridge University Press, New York, 1992, was used in the illustrative embodiment, and the optimal parameters derived were $\alpha=10$ and $Do=0.95$.

5.0 Similarity Measurement

As previously noted, the similarity measurement component 14 in system 10 of FIG. 1 performs similarity measurements based on the rules from the above-described grammar G. The system was tested on a number of exemplary databases, including a wide variety of different pattern images including photographs, interior design, architectural surfaces, historic ornaments and oriental carpets. The application of the four rules, Rules 1 to 4, of the grammar G, is described in greater detail below.

APPLYING RULE 1 (equal pattern): Regardless of color, two textures with exactly the same pattern are always judged to be similar. Hence, this rule concerns the similarity only in the domain of texture features, without actual involvement of any color-based information. Therefore, this rule is implemented by comparing texture features only, using the above-described texture metric. The same search mechanism supports Rule 3 (similar pattern) as well. According to that rule, two patterns that are dominant along the same directions are seen as similar, regardless of their color. In the same manner, textures with the same placement or repetition of the structural element are seen as similar, even if the structural element is not exactly the same. Hence, the value of the distance function in the texture domain reflects either pattern identity or pattern similarity. For example, very small distances mean that two patterns are exactly the same (implying that the rule of identity was used), whereas somewhat larger distances imply that the similarity was judged by the less rigorous rules of equal directionality or regularity.

APPLYING RULE 2 (overall appearance): The actual implementation of this rule involves comparison of both color and texture features. Therefore, the search is first performed in the texture domain, using the above-described texture features and metrics. A set of selected patterns is then subjected to another search, this time in the color domain, using the above-described color features and color metrics.

APPLYING RULE 3 (similar pattern): The same mechanism as in Applying Rule 1 is used here.

APPLYING RULE 4 (dominant color): According to the rule of dominant color, two patterns are perceived as similar if they posses the same color distributions regardless of texture quality, texture content, directionality, placement or repetition of a structural element. This also holds for patterns that have the same dominant or overall color. Hence, this rule concerns only similarity in the color domain, and is applied by comparing color features only.

6.0 Query Types and Other Search Examples

As explained previously, one of the assumptions about the model used in the illustrative embodiment is that chromatic and achromatic components are processed through mostly separate pathways. Hence by separating color representation and color metric from texture representation and texture metric, the invention provides a system with a significant amount of flexibility in terms of manipulation of image features. This is an extremely important issue in many practical applications since it allows for different types of queries. As input into the system the user may be permitted to supply: a) a query and b) patterns to begin the search. The rules given above model typical human queries, such as: "find the same pattern" (Rule 1), "find all patterns with similar overall appearance" (Rule 2), "find similar patterns" (Rule 3), and "find all patterns of similar color", "find all patterns of a given color", and "find patterns that match a given pattern" (Rule 4). Moreover, due to the way the color codebook of the invention is designed, the system supports additional queries such as: "find darker patterns," "find more saturated patterns," "find simple patterns," "find multicolored patterns," "find contrasting patterns." An input pattern provided by the user can be, e.g., supplied by the user, selected from a database, given in the form of a sketch, or provided by any other suitable technique. If the user has color preferences, they can be specified either from the color codebook, or from another pattern.

As an example, consider a query in which the user provides an input pattern in the form of a sketch. There are certain situations when the user is unable to supply an image of the pattern he or she is trying to find. Hence, instead of requiring the user to browse through the database manually, the system may provide tools for sketching the pattern and formulating a query based on the obtained bitmap image. In that case, without any lowpass prefiltering, only a texture feature vector is computed for the bitmap image and used in the search. Furthermore, this search mechanism may allow the user to specify a desired color, by selecting a color $i=\{L_i, a_i, b_i\}$ from the color codebook. Then, the search is performed in two iterations. First, a subset of patterns is selected based on color similarity. Color similarity between the color i and target image B, with the color feature vector $f_c(B)=\{(i_b, p_b) | b \in [1, N_B]\}$, is calculated as $$d(i, B) = \min_{b \in [1, N_B]} D_c(i, i_b),$$

$$D_c(i, i_b) = \sqrt{(L_i - L_b)^2 + (a_i - a_b)^2 + (b_i - b_b)^2}.$$

Next, within the selected set, a search based on texture features is performed to select the best match. A similar search mechanism is applied for combination query, where the desired pattern is taken from one input image and the desired color from another image, or in a search where the desired pattern is specified by an input image and the desired color is selected from the color map.

Figure 4:
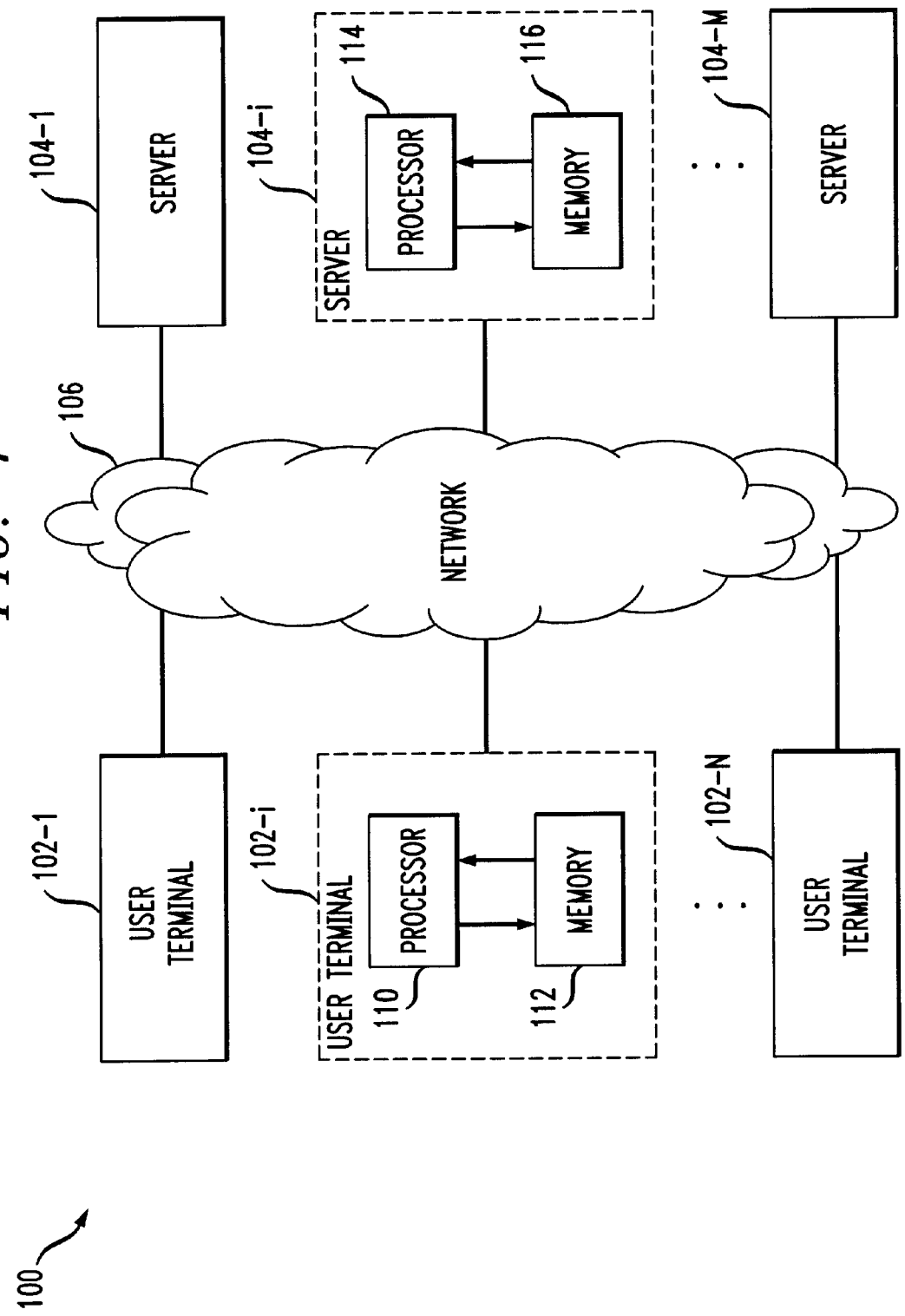
FIG. 4 shows an exemplary communication system application of the pattern retrieval and matching system of FIG. 1.

FIG. 4 shows an exemplary communication system application of the pattern retrieval and matching system 10 of FIG. 1. The communication system 100 includes a number of user terminals 102-i, i=1, 2, . . . N and a number of servers 104-i, i=1, 2, . . . M. The user terminals 102-i and servers 104-i communicate over a network 106. The user terminals 102-i may represent, e.g., desktop, portable or palmtop computers, workstations, mainframe or microcomputers, television set-top boxes, or any other suitable type of communication terminal, as well as portions or combinations of such terminals.

The servers 104-i may be, e.g., computers, workstations, mainframe or microcomputers, etc. or various portions or combinations thereof. One or more of the servers 104-i may be co-located with one or more of the user terminals 102-i, or geographically remote from all of the user terminals 102-i, depending on the specific implementation of the system 100. The network 106 may be, e.g., a global communication network such as the Internet, a wide area network, a local area network, a cable, telephone, wireless or satellite network, as well as portions or combinations of these and other networks. Each of the user terminals 102-i may include a processor 110 and a memory 112, and each of the servers 104-i may include a processor 114 and a memory 116. The processors 110, 114 and memories 112, 116 may be configured in a well-known manner to execute stored program instructions to carry out various features of the invention as previously described.

In operation, a user at one of the user terminals 102-i enters a query regarding a pattern for which the user desires to find matching information in a database accessible by one or more of the servers 104-i. FIG. 5 is a flow diagram illustrating an example of this process as carried out in the communication system of FIG. 4. In step 120, the user utilizes a web browser or other suitable program running in terminal 102-i to log on to a web page associated with a source of pattern information and accessible over the network 106. The web page may be supported by one or more of the servers 104-i. The user in step 122 selects from the web page a database or set of databases which the user would like to search. If the user does not specify a particular database, all of the databases associated with the web page may be searched. In step 124, the user supplies a query image on which the search will be based. The query image may be an image selected from a catalog accessible through the web page, a scanned image supplied by the user, e.g., in the form of a sketch or other previously scanned or downloaded image. The user in step 126 defines a query, i.e., specifies the other parameters of the search, such as the type of matching patterns that are of interest, the number of matches desired, etc.

The user then launches the search by, e.g., clicking an appropriate button or icon on the web page. The query and query image are then supplied over the network 106 to an appropriate one of the servers 104-i. In this embodiment, it is assumed that the system 10 of FIG. 1 is implemented by appropriate programming of one or more of the servers 104-i. The system responds in step 130 by displaying to the user at terminal 102-i a specified number of the best matches. In step 132, the user can continue the process by modifying the search, launching another search, e.g., with a new query image or set of query parameters, or can exit the system.

It should be noted that the particular implementation of the communication system 100 will vary depending on the specific application. For example, in certain applications, such as interior design stores or other facilities, to have the user terminals geographically co-located with one or more of servers. In an Internet-based application, the user terminals may represent personal computers at the user's homes or offices, and the servers may represent, e.g., a server cluster at a remote location designed to process a large number of user queries received from around the world. Many other applications are of course possible.

The invention has been described above in conjunction with an illustrative embodiment of a pattern retrieval and matching system. However, it should be understood that the invention is not limited to use with the particular configurations shown. For example, other embodiments of the invention may take into account image content or domain specific information in performing image retrieval and matching. In addition, the invention can be applied to other types of information signals, such as, for example, video information signals in the form of sequences of video frames. Numerous other alternative embodiments within the scope of the following claims will be apparent to those skilled in the art.

What is claimed is:

1. A system for processing information signals, the system comprising:

a processor operative to compare a first information signal to a second information signal in response to a user query, wherein the first information signal is selected by the user and the second information signal is stored in a database associated with the system, wherein the processor extracts color and texture information from at least the first information signal using a predetermined vocabulary comprising one or more dimensions, and generates a distance measure characterizing the relationship of the first information signal to the second information signal by applying a grammar comprising a set of predetermined rules to the color and texture information extracted from the first information signal and corresponding color and texture information associated with the second information signal, wherein the processor receives the first information signal in the form of an input image A submitted in conjunction with a query from the user, and wherein the processor is further operative to measure dimensions $DIM_i(A)$ from the vocabulary, for i=1, . . . , N, and for each image B from an image database, to apply rules $R_i$ from the grammar to obtain corresponding distance measures $dist_i(A, B)$, where $dist_i(A, B)$ is the distance between the images A and B according to the rule i.

2. The system of claim 1 wherein at least one of the first and second information signals comprises an image.

3. The system of claim 1 wherein at least one of the first and second information signals comprises a sequence of video frames.

4. The system of claim 1 wherein the vocabulary comprises one or more of the following dimensions: overall color, directionality and orientation, regularity and placement, color purity, and pattern complexity and heaviness, and the system generates for at least one of the first and second information signals a set of values associated with one or more of the dimensions.

5. The system of claim 4 wherein the system applies the rules to the set of values.

6. The system of claim 5 wherein the equal pattern file is a function of the dimension of directionality and orientation and the dimension of regularity and placement.

7. The system of claim 5 wherein the overall appearance rule is a function of the dimension of overall color and the dimension of directionality and orientation.

8. The system of claim 5 wherein the similar pattern rule is a function of at least one of the dimension of directionality and orientation and the dimension of regularity and placement.

9. The system of claim 5 wherein the dominant color rule is a function of the dimension of overall color.

10. The system of claim 5 wherein the general impression rule is a function of the dimension of color purity and the dimension of pattern complexity.

11. The system of claim 5 wherein each rule is expressed as a logical combination of one or more of the values generated for at least a subset of the dimensions.

12. The system of claim 1 wherein the processor is further operative to extract an achromatic pattern map from the first information signal using a color distribution generated from the first information signal.

13. The system of claim 1 wherein the color distribution is estimated using a set of color codebooks, with each of the color codebooks corresponding to a different luminance level of the first information signal.

14. The system of claim 1 wherein the processor is further operative to generate a color metric characterizing the similarity of the color information associated with the first and second information signals.

15. The system of claim 1 wherein the processor is further operative to generate a texture metric characterizing the similarity of the texture information associated with the first and second information signals.

16. A system for processing information signals, the system comprising:

a processor operative to compare a first information signal to a second information signal in response to a user query, wherein the first information signal is selected by the user and the second information signal is stored in a database associated with the system, wherein the processor extracts color and texture information from at least the first information signal using a predetermined vocabulary comprising one or more dimensions, and generates a distance measure characterizing the relationship of the first information signal to the second information signal by applying a grammar comprising a set of predetermined rules to the color and texture information extracted from the first information signal and corresponding color and texture information associated with the second information signal, wherein the set of predetermined rules comprises one or more of the following rules: equal pattern, overall appearance, similar pattern, dominant color and general impression, wherein the processor receives the first information signal in the form of an input image A submitted in conjunction with a query from the user, and wherein the processor is, further operative to measure dimensions $DIM_i(A)$ from the vocabulary, for i=1, ..., N, and for each image B from an image database, to apply rules $R_i$ from the grammar to obtain corresponding distance measures $dist_i(A, B)$, where $dist_i(A, B)$ is the distance between the images A and B according to the rule i.

17. A system for processing information signals, the system comprising:

a processing device having a processor coupled to a memory, the processor being operative to compare a first information signal to a second information signal in response to a user query, wherein the first information signal is selected by the user and the second information signal is stored in a database associated with the system, wherein the processor extracts color and texture information from at least the first information signal using a predetermined vocabulary comprising one or more dimensions, and generates a distance measure characterizing the relationship of the first information signal to the second information signal by applying a grammar comprising a set of predetermined rules to the color and texture information extracted from the first information signal and corresponding color and texture information associated with the second information signal, wherein the set of predetermined rules comprises one or more of the following rules: equal pattern, overall appearance, similar pattern, dominant color and general impression, wherein the processor receives the first information signal in the form of an input image A submitted in conjunction with a query from the user, and wherein the processor is further operative to measure dimensions $DIM_i(A)$ from the vocabulary, for i=1, ..., N, and for each image B from an image database, to apply rules $R_i$ from the grammar to obtain corresponding distance measures $dist_i(A, B)$, where $dist_i(A, B)$ is the distance between the images A and B according to the rule i.

18. A system for processing information signals, the system comprising:

a processing device having a processor coupled to a memory, the processor being operative to compare a first information signal to a second information signal in response to a user query, wherein the first information signal is selected by the user and the second information signal is stored in a database associated with the system, wherein the processor extracts color and texture information from at least the first information signal using a predetermined vocabulary comprising one or more dimensions, and generates a distance measure characterizing the relationship of the first information signal to the second information signal by applying a grammar comprising a set of predetermined rules to the color and texture information extracted from the first information signal and corresponding color and texture information associated with the second information signal, wherein the processor receives the first information signal in the form of an input image A submitted in conjunction with a query from the user, and wherein the processor is further operative to measure dimensions $DIM_i(A)$ from the vocabulary, for i=1, ..., N, and for each image B from an image database, to apply rules $R_i$ from the grammar to obtain corresponding distance measures $dist_i(A, B)$, where $dist_i(A, B)$ is the distance between the images A and B according to the rule i.

* * * * *